Oct. 29, 1940.  F. L. GOSS  2,219,893
METHOD OF AND MEANS FOR DAMPING CABLE VIBRATION
Filed May 16, 1936
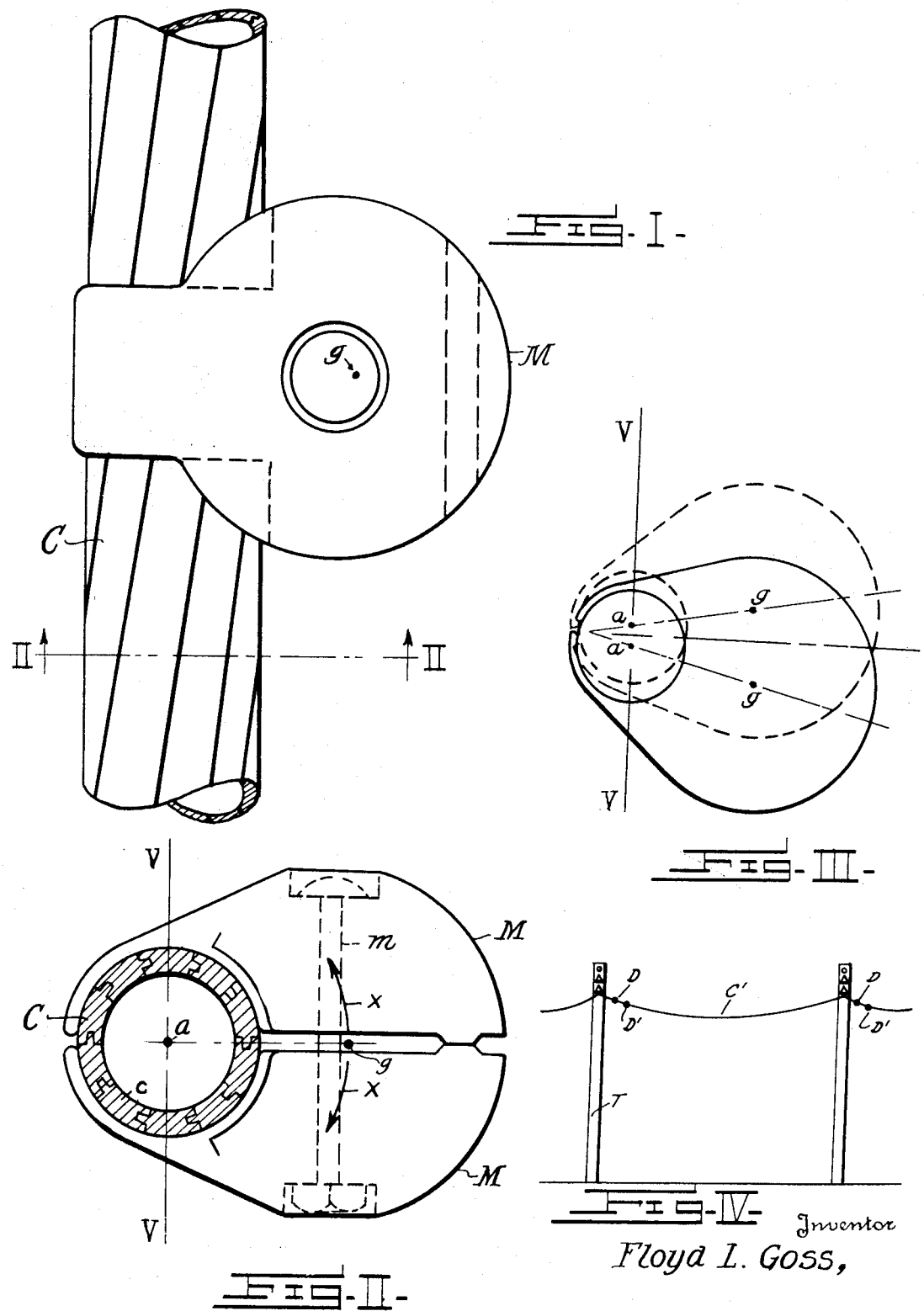
Inventor
Floyd L. Goss,
By Samuel Herrick,
Attorney Patented Oct. 29, 1940

2,219,893

UNITED STATES PATENT OFFICE 2,219,893

METHOD OF AND MEANS FOR DAMPING CABLE VIBRATION

Floyd L. Goss, Los Angeles, Calif., assignor, by direct and mesne assignments, to General Cable Corporation, New York, N. Y., a corporation of New Jersey Application May 16, 1936, Serial No. 80,215

12 Claims. (Cl. 174—42)

This invention relates to a device for reducing the amount of vibration of cables in overhead spans when the cables are set in vibration by the action of wind or air currents. It is an object of the invention to provide new and improved means for substantially reducing vibration in cables suspended in spans. It is a further object of the invention to provide a new and improved method of damping cable vibration. Other objects and advantages of the invention will appear hereinafter.

The device consists of a substantial mass rigidly fastened to the cable at some point in the span. The center of gravity of the substantial mass is disposed eccentrically to the axis of the cable and to one side of the plane of vibration of the cable.

When a cable suspended in an overhead span is acted upon by a steady wind or air current, it is frequently set into vibration in the manner of the "Aeolian harp." Such vibrations are very often of sufficient intensity to be destructive to the cable. The vibration herein referred to is not the horizontal swaying of the cable due to the direct force of the wind, but the vertical periodic vibration of the cable induced by the regular alternate formation of air eddies or vortecii on the top and bottom sides of the cable.

In the accompanying drawing:

Figure I is a plan view of a section of cable having a vibration damper embodying the present invention applied thereto;

Fig. II is a transverse sectional view upon line II—II of Fig. I, looking in the direction indicated by the arrows;

Fig. III is a diagrammatic view illustrating the action of the device in use; and Fig. IV is a diagrammatic view of a cable span having a plurality of dampers secured thereon.

Like numerals designate corresponding parts throughout the several figures of the drawing.

In the particular form of the invention which I have chosen for purposes of illustration, the substantial mass comprises a pair of relatively heavy members M—M which are clamped upon the cable by a bolt $m$. The cable may be of any desired type, the one chosen for purposes of illustration being of a form composed of a plurality of interlocking spirally disposed sections which complementally form the cable C. The substantial mass M—M is rigidly clamped or fixed to the cable by the bolt.

V—V represents the vertical plane passing through the axis of the cable and is the plane of vibration of the cable due to the action of the wind. The center of gravity $g$ of the mass M—M is disposed eccentrically to the axis $a$ of the cable C and to one side of the plane of vibration V—V of the cable C.

Vibration of the cable C causes the mass M—M to oscillate as shown by the arrows $x$ from point $g$, Fig. II, and as shown in Fig. III. Fig. III illustrates the extreme positions of vibration and shows the relative vibrational movement of the cable C and the mass M—M. As shown, the mass M—M has a much greater amplitude of vibration than the cable C. This causes a slight rotation of the cable, and the resulting friction between the strands or segments of the cable as they move relative to each other, from this rotation, absorbs a very large percentage of the entire energy of vibration.

This type of vibration damper has been investigated over a period of several months, both in the laboratory and in the field under natural conditions. It has reduced the amplitude of vibration of a cable by 80%, as well as reduced the time of material vibration of the cable from natural causes.

This vibration damper will function so long as the center of gravity $g$ of the mass M—M does not coincide with the plane of vibration V—V. It operates most effectively in the position as shown where point $g$ is at right angles to the plane of vibration V—V from point $a$ on the cable axis.

The damper is fastened to the cable in the span at one or more points least likely to form a vibrational node. These points vary with the weight, diameter, and tension of the cable and the velocity of the wind, but are ordinarily from 2½ to 7 feet from the points of support of the cable. Beneficial results are obtained by using two or more dampers attached to the cable at points a few feet apart. Such points are chosen to be in the usually encountered range of antinodes of cable vibration. Such an arrangement is illustrated in Fig. IV, wherein a cable C' suspended in a span between towers T has secured near one end of the span, at points spaced a few feet apart, two dampers D and D'.

In such cases it is also beneficial to vary the mass M—M, or the distance between $a$ and $g$, Fig. II, for the several dampers so as to produce an increasing vibrational time constant from the damper closest to the cable support to the damper farthest from the cable support.

While the very simple form of damper illustrated in the accompanying drawing is well adapted to serve the purposes intended, it is apparent that many other ways of applying the principles herein disclosed, through the medium of other physical embodiments of the invention, will suggest themselves to those skilled in this art. I therefore wish it to be understood that the invention is not limited to the particular damper shown, but that it includes within its purview whatever changes fairly come within either the terms or the spirit of the appended claims.

Having disclosed the invention, I claim:

1. In combination with a cable in a span, a vibration damper comprising a substantial mass rigidly fastened to the cable at a point subject to vibration with the center of gravity of the enire mass disposed eccentrically to the axis of the cable and to one side of the vertical plane passing through the axis of the cable.

2. In combination with a cable in a span, a vibration damper comprising a substantial mass rigidly fastened to the cable eccentrically thereof at a point between the ends of the span, the eccentricity being primarily in the horizontal direction so that the mass produces torque in the cable.

3. In combination with a cable in a span, a vibration damper comprising a substantial mass rigidly fastened to the cable at a point between the ends of the span with the center of gravity of the entire mass horizontally offset from the axis of the cable.

4. In combination with a cable in a span, a vibration damper comprising several independent substantial masses rigidly fastened to the cable at points spaced longitudinally along the cable between the ends of the span, each mass with its center of gravity horizontally offset from the axis of the cable, so as to apply twisting stress to the cable at the longitudinally spaced points.

5. In combination with a cable in a span, a vibration damper comprising a substantial mass rigidly affixed to the cable at a point between the ends of the span, the major portion of the entire mass so affixed to the cable being offset in a substantially horizontal plane to one side of the axis of the cable.

6. In combination with a cable in a span, a vibration damper consisting of a substantial mass comprising at least two parts, means for rigidly clamping said parts together and upon said cable at a point between the ends of the span, the major portion of the weight of the entire mass being disposed offset from the axis of the cable and substantially at right angles to the vertical plane through the axis of the cable.

7. A vibration damper for transmission lines or the like supported in spans comprising two hemispherical members of substantial mass having cooperating jaws for clamping the cable therebetween with the axis of the cable substantially on the circumference of the hemispherical members, and means for securing the two hemispherical members together with the cable securely clamped between the cooperating jaws.

8. The combination with a stranded line conductor of the class described, of a weight rigidly secured to the conductor with its centre of gravity displaced from the vertical plane containing the axis of the conductor, whereby vibrations of the conductor result in varying torsional forces being applied to the conductor thus to convert the energy of conductor vibrations into interstrand frictional losses.

9. The combination with a line conductor in a span, of damper means comprising an element rigidly mounted on the conductor and a mass suspended by said element at a point on the line subject to vibrations, said mass being sufficiently large and having its centre of gravity so located to produce varying twisting forces on the conductor during vibrations thus to convert the energy of conductor vibrations into energy losses within the conductor.

10. In combination with a cable in a span, a vibration damper comprising a substantial mass rigidly secured on the cable at a point between the ends of the span with the center of gravity of the mass at one side of the vertical plane passing through the axis of the cable which results in torsional forces being applied to the cable varying with the amplitude of cable vibration, thus to convert energy of cable vibration into energy losses within the cable.

11. The method of damping vibration in a cable suspended between supports which comprises converting vertical vibration imparted to the cable by a disturbing force into torsional vibration of the cable about its longitudinal axis and absorbing energy of torsional vibration in friction loss within the cable.

12. The method of damping vibration in a cable suspended between supports which comprises torsionally vibrating the cable about its longitudinal axis as the cable vibrates vertically and limiting the vertical vibration by absorbing energy of torsional vibration in friction loss within the cable.

FLOYD L. GOSS.